United States Patent
Kitagawa et al.

(12)

(10) Patent No.: US 6,335,853 B1
(45) Date of Patent: Jan. 1, 2002

(54) PROTECTIVE DEVICE FOR NON-CONTACT FEEDER SYSTEM

(75) Inventors: Hiroshi Kitagawa; Masato Inaba; Kazutoshi Takeda, all of Komaki (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 09/345,120

(22) Filed: Jul. 6, 1999

(30) Foreign Application Priority Data

Jan. 9, 1997 (JP) .......................................... 9-1751
Dec. 8, 1997 (JP) ...................................... 9-336214

(51) Int. Cl.⁷ .................................................. H02H 5/04
(52) U.S. Cl. ......................................... 361/103; 361/104
(58) Field of Search ...................................... 361/103, 104, 361/106, 107, 93.1, 93.8, 117, 124, 139, 140; 337/4, 6, 15, 31; 219/54, 56.1, 130.1, 130.21; 338/13, 25

(56) References Cited

U.S. PATENT DOCUMENTS

| | | | | |
|---|---|---|---|---|
| 3,628,093 | A | * 12/1971 | Crowley | 361/103 |
| 4,251,718 | A | * 2/1981 | Cole | 219/501 |
| 4,436,986 | A | * 3/1984 | Carlson | 219/505 |
| 5,141,580 | A | * 8/1992 | Dufour et al. | 156/158 |
| 5,801,914 | A | * 9/1998 | Thrash | 361/104 |
| 6,014,004 | A | * 1/2000 | Hamoaka et al. | 318/778 |

FOREIGN PATENT DOCUMENTS

| | | |
|---|---|---|
| EP | 0289868 | 4/1988 |
| JP | 5894785 | 6/1983 |
| JP | 214694 | 1/1990 |
| JP | 06201507 | 7/1994 |
| JP | 07023529 | 1/1995 |
| JP | 08007729 | 1/1996 |
| JP | 8251704 | 9/1996 |

* cited by examiner

*Primary Examiner*—Kim Huynh
(74) *Attorney, Agent, or Firm*—Reising, Ethington, Barnes, Kisselle, Learman & McCulloch, P.C.

(57) ABSTRACT

A thermosensitive wire (15), including a pair of phosphor bronze round wires which cause a short-circuit when the ambient temperature exceeds a predetermined temperature, is laid along an induction line (14), and a protective device (25) including a DC power supply unit (33) for applying a DC voltage and a meter relay (35) for detecting that the thermosensitive wire (15) has caused a short-circuit is provided on both ends of the thermosensitive wire (15). An alarm output (35A) of the meter relay (35) is outputted to a high-frequency generating circuit (24) so as to shut down a high-frequency current to be supplied to the induction line (14). With this structure, even when a metal such as a tool made of iron is erroneously set near the induction line (14), the heating thereof may be detected by using the thermosensitive wire (15) and the high-frequency current flowing through the induction line (14) may be shut down. Thus, fire accidents such that the induction line (14) is heated and burnt by further heating may be prevented.

6 Claims, 9 Drawing Sheets

PROTECTIVE DEVICE FOR NON-CONTACT FEEDER SYSTEM

TECHNICAL FIELD

The present invention relates to a protective device for a non-contact feeder system which feeds power in a non-contact state to a moving body or the like which travels guided by a rail.

BACKGROUND ART

As a known non-contact feeder system, there is a system which assumes an occurrence of a fire and has a protective device to avoid such occurrence of the fire as disclosed in, for example, Japanese Patent Application Laid-Open No. 8-251704.

The above-described fire is assumed to occur when an eddy current flows through a metal (for example, a spanner) set in proximity to an induction line by means of magnetic flux generated from the induction line, through which a high-frequency current flows, to cause the metal to generate heat, and the induction line is heated by the heat and burned.

The protective device is composed of: an optical fiber cable laid along an induction line; a luminous unit and a light intercepting unit which are connected to the ends of this optical fiber cable; a detecting circuit connected to the light intercepting unit, for detecting a light damping factor, and outputting an alarm when the light damping factor exceeds a predetermined damping factor; and a circuit for shutting down the high-frequency current on the basis of the alarm output from this detecting circuit.

As a general protective device, there has often been used a conventional device in which a system always generating heat in a fed state is mounted with a bimetal which is actuated when this system abnormally generates heat so that the feeding to the system is shut down by the operation of the bimetal thereby to protect the system.

With the above-described known structure of the protective device of a non-contact feeder system, however, the following problems arise:
1. The above-described optical fiber cable has problems that when the cable is pressed or bent, the amount of transmittance thereby decreases, the detection distance thereof becomes shorter or the operation thereof becomes paralyzed, and that it is difficult to connect the cable and to execute work thereof.
2. Although the induction line is protected, no protection means are provided against abnormal heating of a pickup coil which occurs due to damage to the pickup coil placed on a moving body to oppose to the induction line, and against abnormal heating in the circuit substrate for feeding the power to a load by an electromotive force induced by the pickup coil.
3. In a system in which a bimetal is the only protection means, when the temperature of the system lowers due to a shut-down of the feeding, the bimetal becomes off again to resume the feeding, and the system is re-started while the cause for the abnormal heating is still unknown, which may possibly expand the abnormal state.

DISCLOSURE OF THE INVENTION

It is an object of the present invention to solve these problems, and to provide a non-contact feeder system which is not affected by bending, is easy to execute the work, and yet does not generate heat by a magnetic flux generated from the induction line, in addition to being capable of preventing a fire by detecting heat generated near the induction line.

In order to achieve this object, there is provided a protective device for a non-contact feeder system according to the present invention, in which an induction line for flowing a high-frequency current therethrough is laid along a moving path of a moving body, and the moving body is provided with a coil for inducing therein an electromotive force by a magnetic flux generated in said induction line so as to feed power to a load of said moving body by means of the electromotive force induced by said coil, characterized in that: a thermosensitive wire, formed by intertwisting a pair of conductors made of non-magnetic material and covered with insulators which soften at a predetermined temperature, is laid along the induction line; and when the ambient temperature exceeds said predetermined temperature, the insulators of the thermosensitive wire soften and the conductors are short-circuited, thereby causing the high-frequency current to be shut down.

With such structure, the insulators soften to short-circuit the conductors, whereby it is detected that there is a heating unit near the induction line. This detection output shuts down the high-frequency current, whereby the induction line is prevented from being heated, burning and causing a fire by the heat of the heating unit. Since it is formed by the conductors made of a non-magnetic material, the thermosensitive wire is not affected by the electromagnetic induction of the induction line, does not generate heat itself, is not affected by bending, and therefore is easy to execute the work.

BEST MODE FOR CARRYING OUT THE INVENTION

First Embodiment

Figure 1:
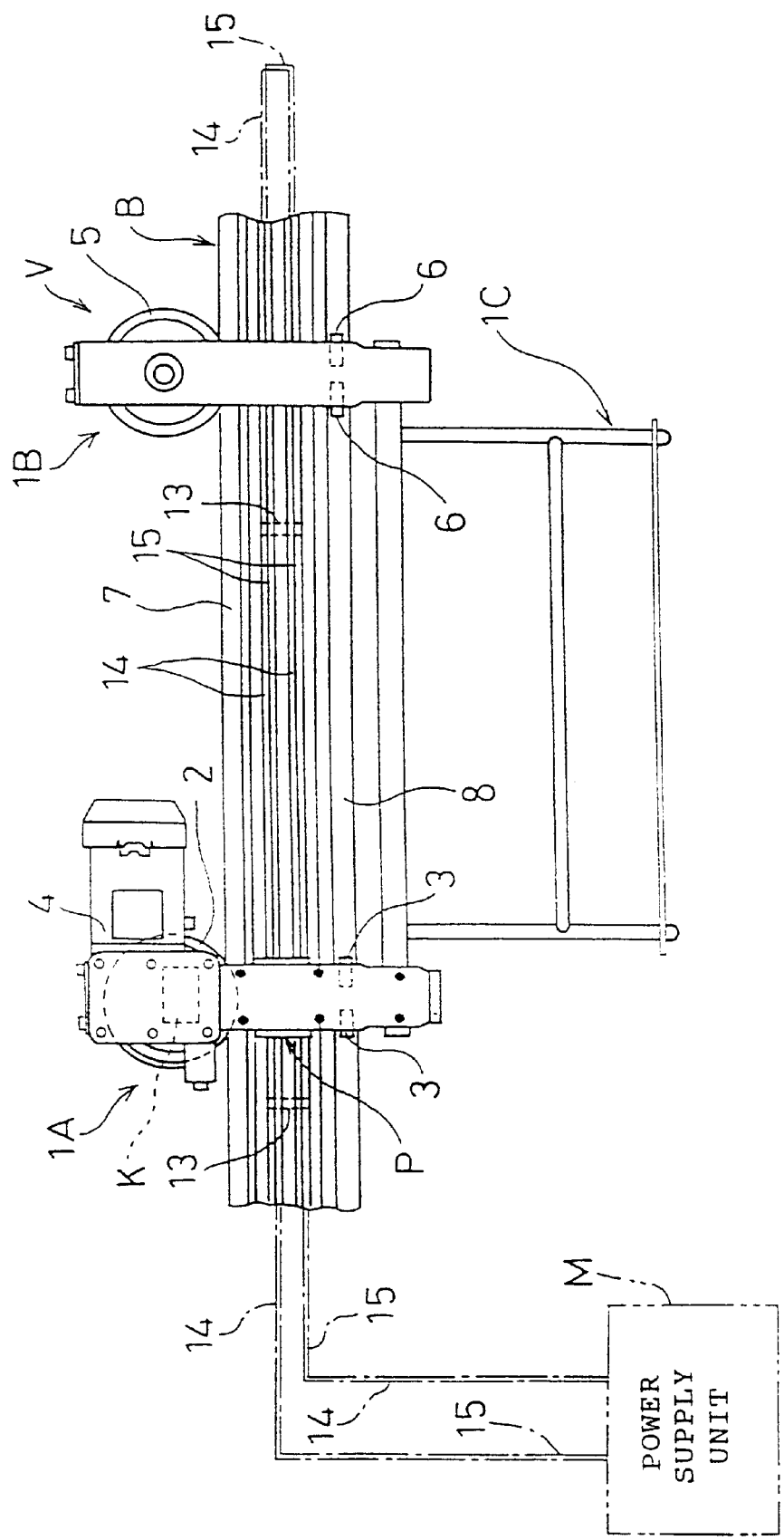
FIG. 1 is a side view of a principal part of a non-contact feeder system according to a first embodiment of the present invention.
Figure 2:
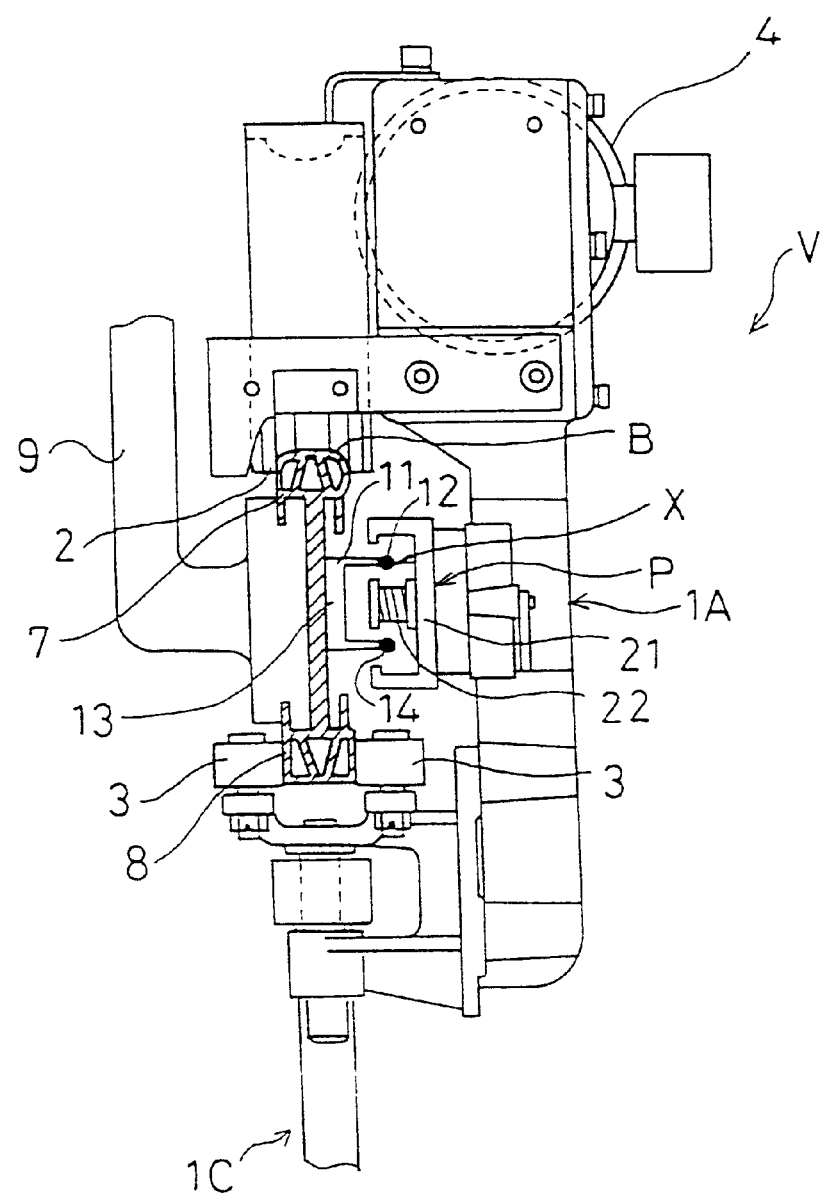
FIG. 2 is a partial front sectional view of the non-contact feeder system.

As shown in FIGS. 1 and 2, a vehicle V, which is an example of a moving body, is comprised of a driving trolley 1A, a driven trolley 1B and an article carrying carrier 1C to be supported by these trolleys 1A and 1B. Also, there is provided a guide rail B which movably guides this vehicle V.

The driving trolley 1A includes a traveling wheel 2 for engaging with the upper portion of the guide rail B, a steady rest roller 3 which comes into contact with the lower portion of the guide rail B from the opposite lateral sides, an electric motor 4 equipped with a reduction gear for driving the traveling wheel 2, a pickup unit P and a circuit substrate K.

The driven trolley 1B includes a traveling wheel 5 for engaging with the upper portion of the guide rail B, and a steady rest roller 6 which comes into contact with the lower portion of the guide rail B from the opposite lateral sides.

The guide rail B includes a wheel guide unit 7 at the upper portion thereof and a roller guide portion 8 at the lower portion thereof, and is supported by a supporting frame 9 coupled to one lateral side portion thereof in a hung-down state from the ceiling or the like. An induction line unit X is mounted to the other lateral side portion of the guide rail B than the lateral side portion to which the supporting frame 9 of the guide rail B is mounted.

[Induction Line and Power Supply Unit on Primary Side and Their Protection]

Figure 3:
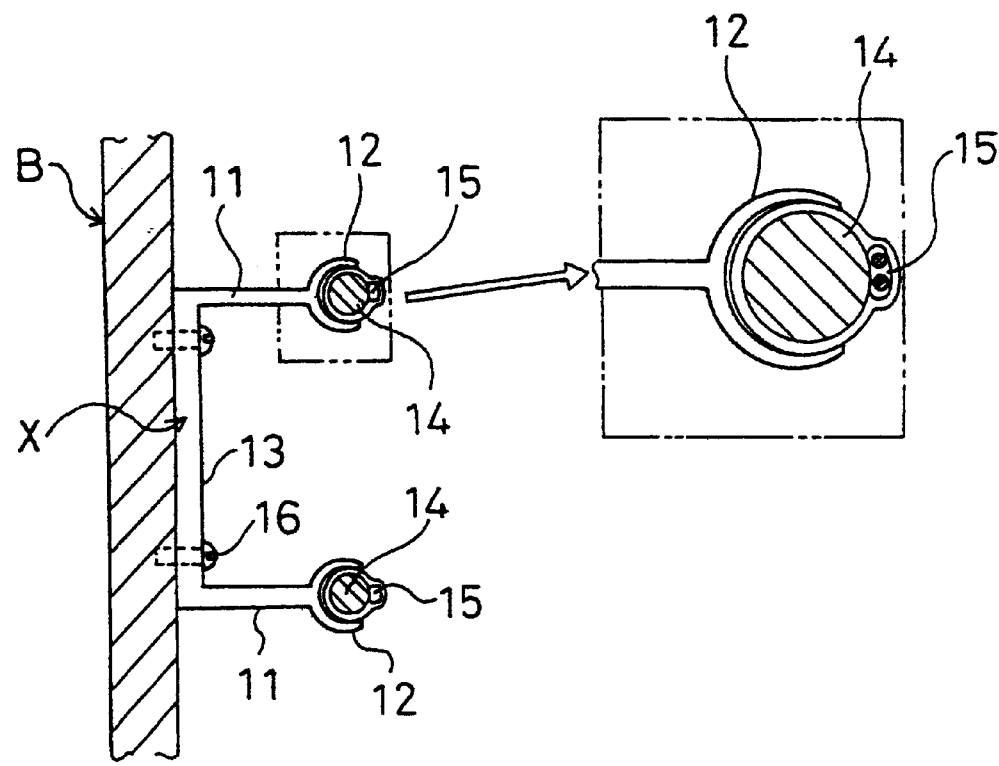
FIG. 3 is a side sectional view of a bracket of the non-contact feeder system.

The induction line unit X is comprised of brackets 13 arranged at predetermined intervals on the one lateral side portion of the guide rail B along the guide rail B, induction lines 14 each fitted in an engaging portion 12 of an hanger 11 of the bracket 13 as enlargedly shown in FIG. 3, and thermosensitive wires 15 each clamped to the induction line 14.

A pair of upper and lower hangers 11 of the bracket 13 are projectingly provided from one lateral surface of the guide rail B in a direction perpendicular thereto, and at each tip end of these pair of upper and lower hangers 11, there is provided the ring-shaped engaging portion 12 which is formed integrally with the hanger 11, of which tip end is opened, and which is flexible and maintains a predetermined shape. The bracket 13 is mounted to the guide rail B with a metal fitting made of the same material as of the guide rail B, such as screws 16 made of aluminum.

The induction line 14 and the thermosensitive wire 15 are connected to a power supply unit M, as shown in FIG. 1. The induction line 14 is constituted by coating a stranded conductor (hereinafter, called litz wire) formed by collecting insulated fine strands with an insulator, for example, a resin material such as vinyl chloride.

Figure 4A:
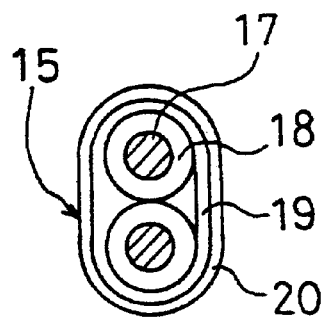
FIG. 4(a) is a sectional view of a thermosensitive wire of a non-contact feeder system.
Figure 4B:
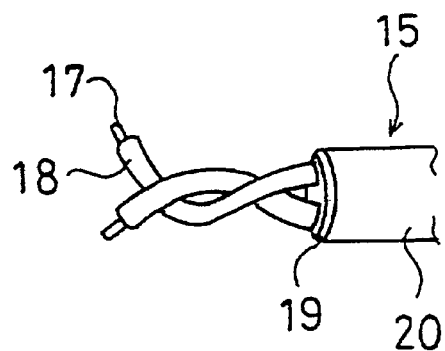
FIG. 4(b) is a side view of a thermosensitive wire of a non-contact feeder system.

The thermosensitive wire 15 shown in FIG. 4 is comprised of a pair of conductors 17 made of a non-magnetic phosphor bronze round wire, an insulator 18 made of a thermoplastic which is sensitive to heat and is coated on each of the conductors 17, and a tape 19 and a sheath 20 to be coated on the pair of conductors 17 intertwisted and covered by the insulator 18. With this structure, when the ambient temperature exceeds a predetermined temperature, the insulator 18 in the thermosensitive wire 15 softens, and the pair of conductors 17 intertwisted cause a spring action, thus causing a short-circuit.

Figure 5:
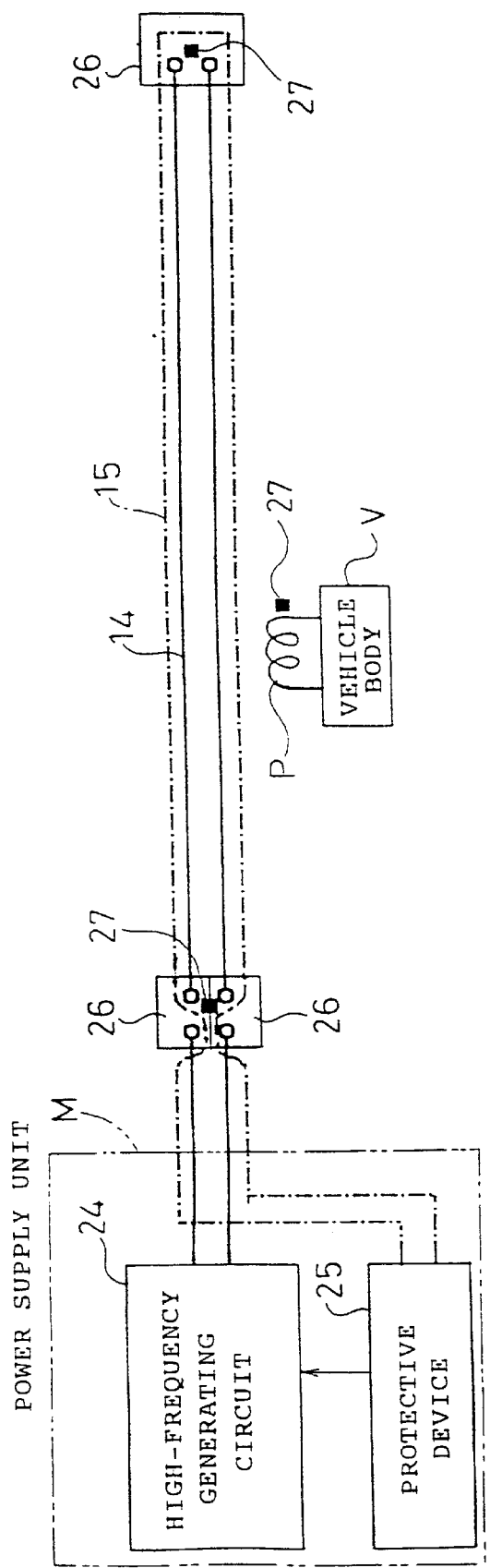
FIG. 5 is a block diagram showing a principal circuit of the non-contact feeder system.

The power supply unit M is comprised of a high-frequency generating circuit 24 for supplying a high-frequency current to the induction line 14, and a protective device 25 connected to the ends of the thermosensitive wire 15, as shown in FIG. 5. The induction line 14 is normally laid through relay terminals 26, and each of these relay terminals 26 is attached with a thermolabel 27 which changes its color when the ambient temperature exceeds a predetermined temperature, as shown in FIG. 5.

Figure 6:
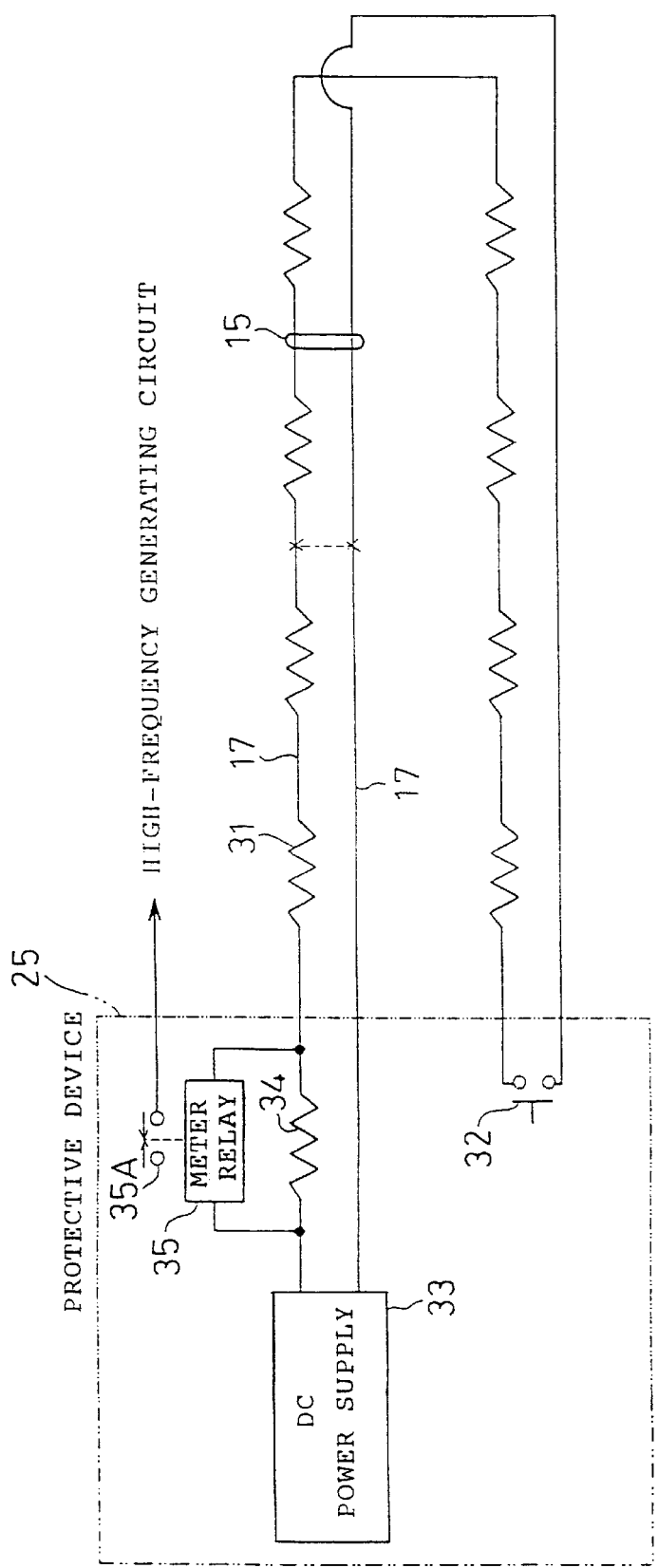
FIG. 6 is a block diagram showing a protective circuit of the non-contact feeder system.

FIG. 6 shows the protective device 25 and the circuit of the thermosensitive wire 15.

In one conductor 17 of the thermosensitive wire 15, resistors 31 made of a non-magnetic material are connected at predetermined intervals in series.

The protective device 25 is provided with a test switch 32 connected to the terminal ends of the pair of conductors 17, a DC power supply unit 33 connected to the beginning ends of the pair of conductors 17, a detection resistor 34 connected to the conductor 17 in series, and a meter relay 35 connected in parallel with this resistor 34.

The test switch 32 is normally formed to be an open-state push-button switch. The detection resistor 34 and the meter relay 35 are provided as means for detecting that the conductor 17 is short-circuited, that is, as means for detecting a current flowing through the conductor 17. A detection contact 35A of the meter relay 35 is set in such a manner that it is actuated by a minimum current which flows when a short-circuited state is formed by the test switch 32. Since the value of a current flowing through the conductor 17 differs depending upon a short-circuit point, the position of the short-circuit point can be read from a display on the meter of the meter relay 35.

The detection contact 35A of the meter relay 35 is connected to the high-frequency generating circuit 24, and when this detection contact 35A is actuated, the high-frequency generating circuit 24 shuts down a high-frequency current.

The operation based on the above-described circuit structure will be described.

First, the test switch 32 is pressed while a voltage is applied to the conductor 17 of the thermosensitive wire 15 from the DC power supply unit 33 of the protective device 25, and the current value at the time is confirmed by the display on the meter of the meter relay 35, and the detection contact 35A is set so as to be actuated at this current value.

Thus, a high-frequency current is supplied from the high-frequency generating circuit 24 to the induction line 14. By means of a magnetic flux generated in this induction line 14, a power is fed to a vehicle V located on the guide rail B in a non-contact state (details will be described later).

Should a metal such as a tool made of iron be erroneously placed near the induction line 14, an eddy current would flow through the metal by means of the magnetic flux generated by the induction line 14 to cause the metal to generate heat, and the thermosensitive wire 15 would be heated by this heat. When the temperature reaches, for example, 90° C., the insulator 18 softens,. the pair of intertwisted conductors 17 cause a spring action and short-circuit, a current flows through the conductor 17, the detection contact 35A of the meter relay 35 is actuated, and this actuation of the detection contact 35A causes the high-frequency generating circuit 24 to shut down the high-frequency current which has been supplied thereby. Therefore, the metal will not generate heat any longer, but cools down, whereby the induction line 14 is prevented from heating, burning and firing by the heat generated by the metal. The short-circuit point of the conductor 17 can be detected by confirming the current value displayed on the meter relay 35. Also, it can be confirmed whether or not the ambient temperature exceeds a predetermined temperature by monitoring the color of the thermolabel 27 attached to the relay terminal 26.

In this manner, even in a case where a metal such as a tool made of iron should be erroneously set near the induction line 14, the heating is detected through the use of the thermosensitive wire 15 and the high-frequency current flowing through the induction line 14 is shut down, whereby it is possible to prevent a fire accident in which the induction line 14 is heated and burns. Normally, it is possible to prevent the system from being rusted through gas which is produced when vinyl chloride forming the coat of the induction line 14 burns, and the non-contact feeder system can be used without anxiety within any facilities sensitive to dirt. By confirming the current value displayed on the metal relay 35, a short-circuit point of the conductor 17 can be detected, in other words, a place where a fire would have been caused can be specified, and therefore, the cause can be removed by investigating immediately whether or not a metal such as a tool made of iron might has been erroneously set near. As a result, time to restore normal operation of the system can be saved and any reduction in the actual operating time can be restrained.

Since the thermosensitive wire 15 can be freely bent and also easily connected, the execution of work is facilitated, and time for a laying operation can be shortened. Also, it is possible to lay the thermosensitive wire 15 on the hanger 11 which is a support for the induction line 14 together with the induction line 14, and there is no need for another support. Therefore, the system cost can be reduced. In addition, the cost for the thermosensitive wire 15 itself is low, and the system cost can be further reduced.

In this respect, in the present first embodiment, the induction line 14 and the thermosensitive wire 15 are provided as respective lines, but the lines may also be made into an induction line having the thermosensitive wire 15 embedded therein. This structure can facilitate the laying operation.

Also, in the present first embodiment, the meter relay 35 has been used as the short-circuit detecting means for the conductor 17 of the thermosensitive wire 15, but the structure may be arranged such that the current of the conductor 17 can be detected and a current shut-down signal can be outputted to the high-frequency generating circuit 24. For example, the structure can be arranged such that a current detector is connected to the conductor 17, the detected current value is inputted into a computer, it is confirmed by this computer whether or not a current is present, and a current shut-down signal is outputted to the high-frequency generating circuit 24. Also, using a computer, the heating position may be specified for outputting by a computation based on the resistance value of the resistor 31 from the detected current value. [System of Vehicle V on Secondary Side and Their Protection]

A pick-up unit P mounted onto the driving trolley 1A is, as shown in FIG. 2, comprised of ferrite 21 having an E-shaped cross section and a pickup coil 22 formed by winding 10 to 20 turns of the litz line around this ferrite 21. The pickup unit P is fixed to the driving trolley 1A by adjusting such that the center of a convex portion at the center of the ferrite 21 is located perpendicularly to the guide rail B at the substantially center of a pair of induction lines 14 of the induction line unit X. When the induction line 14 is electrically energized (AC), an electromotive force is generated in the pickup coil 22. A thermo label 27 is attached to the pickup unit P as shown in FIG. 5.

Figure 7:
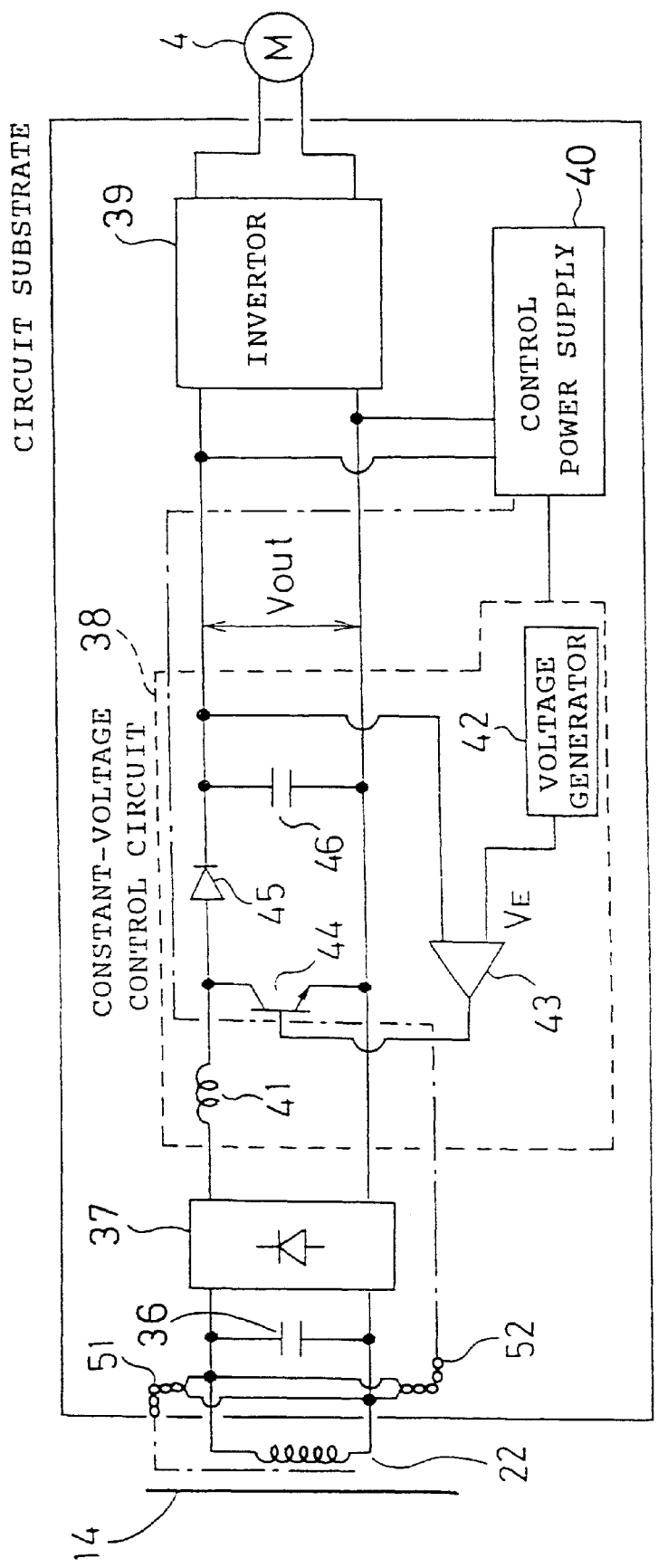
FIG. 7 is a block diagram showing another principal circuit of the n on-contact feeder system.

On a circuit substrate K, as shown in FIG. 7, there are arranged a capacitor 36 connected to the pickup coil 22 in parallel and forming a resonance circuit which resonates to the frequency of the induction line 14 together with the pickup coil 22, a rectifier/smoothing circuit 37 connected to the capacitor 36, a constant-voltage control circuit 38 connected to the rectifier/smoothing circuit 37 and controlling an output voltage Vout to a reference voltage VB, and an invertor 39 and a control power supply unit 40 which are connected to the constant-voltage control circuit 38. An electric motor 4 with a reduction gear is connected to the invertor 39.

The above-described constant voltage control circuit 38 is comprised of a current limiting coil 41, a voltage generator 42 for generating the reference voltage VE, a comparator 43 for comparing the output voltage Vout with the reference voltage VE, an output adjusting transistor 44 composed of FET which is turned on by the comparator 43 when the output voltage Vout exceeds the reference voltage VE, and a diode 45 and a capacitor 46 which form a filter. Control power supply is supplied from the control power supply unit 40 to the voltage generator 42 and the comparator 43.

With the structure of this constant-voltage control circuit 38, when the load decreases because of stoppage or the like of the electric motor 4 and as a result, the output voltage Vout rises to exceed the reference voltage VE, the output adjusting transistor 44 is turned on by the comparator 43, and the output voltage Vout is lowered so that it is maintained at the reference voltage VE.

In FIG. 7, reference numeral 51 designates a first thermosensitive wire, and 52, a second thermosensitive wire. These thermosensitive wires 51 and 52 use the same thermosensitive wire as the above-described thermosensitive wire 15.

Figure 8:
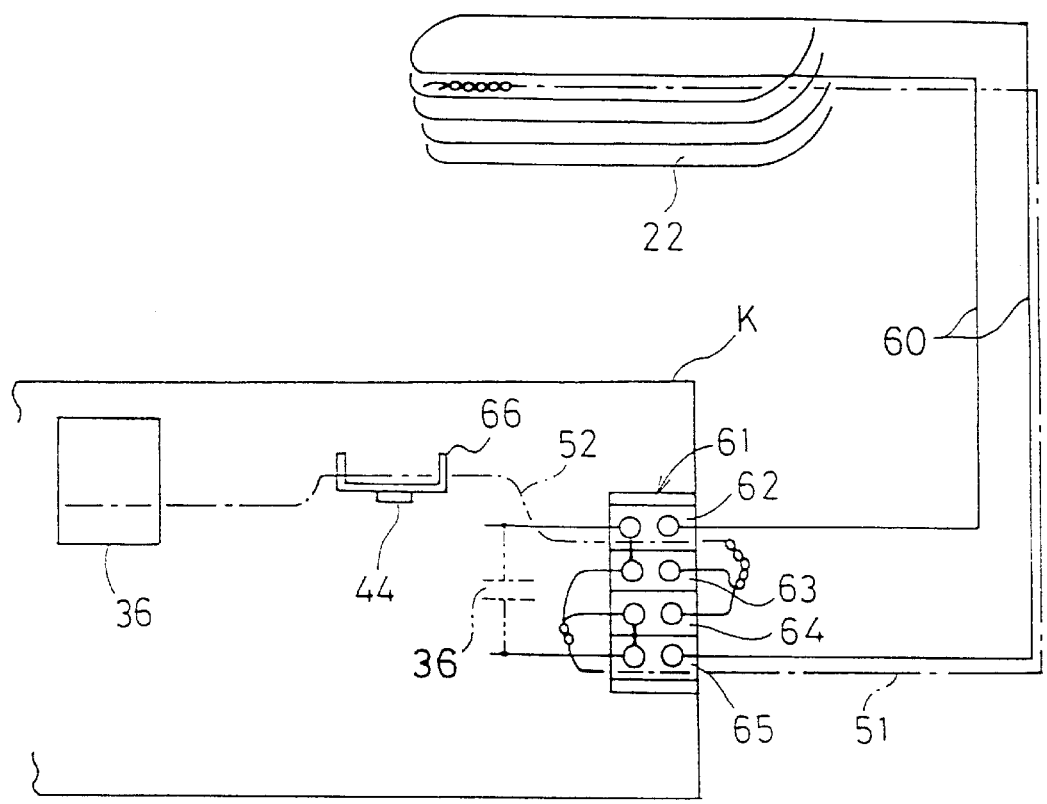
FIG. 8 is a laying view of a thermosensitive wire to be laid on a pickup coil and a circuit substrate of the non-contact feeder system.

The first thermosensitive wire 51 is, as shown in FIGS. 7 and 8, laid along the pickup coil 22, a wiring 60 which connects between the pickup coil 22 and the circuit substrate K, and a fourth terminal 65 of a terminal block 61 of the circuit substrate K, and a pair of conductors 17 of the first thermosensitive wire 51 are connected to a second terminal 63 and a third terminal 64 of the terminal block 61 respectively. The tip ends of the pair of conductors 17 of the first thermosensitive wire 51 are integrally fixed together with litz line which forms the pickup coil 22 with epoxy resin spaced apart by a predetermined distance (for example, several mm). The wiring 60 is connected to the first terminal 62 and the fourth terminal 65 of the terminal block 61, and the first terminal 62 and the second terminal 63 are connected while the third terminal 64 and the fourth terminal 65 are connected.

The second thermosensitive wire 52 is laid near a mounting chassis 66 of an output adjusting transistor 44 composed of FET which is one example of a heating unit of the vehicle, near the control power supply unit 36, and along the first terminal 62 of the terminal block 61 of the circuit substrate K, the pair of conductors 17 of this second thermosensitive wire 52 being connected to the second terminal 63 and the third terminal 64 of the terminal block 61 respectively. When contact failure occurs between the terminals 62 to 65 and the wiring connected to these terminals 62 to 65, the terminal block 61 is heated.

The operation based on the above-described circuit structure will be described.

A high-frequency current is supplied from the power supply unit M to the induction line 14, magnetic flux generated in this induction line 14 causes a great electromotive force to the pickup coil 22 of the vehicle V located on the guide rail B, an AC current generated from this electromotive force is rectified by the rectifier/smoothing circuit 33, the output voltage Vout is maintained at the reference voltage VE in the constant-voltage control circuit 34, and is supplied to the electric motor with a reduction gear 4 through the control power supply unit 36 and the invertor 35. The vehicle V as a moving body moves as being guided by the guide rail B when the traveling wheel 2 is driven by the electric motor 4 to which power is fed.

If the litz line of the pickup coil 22 should be damaged, the litz line is heated by a magnetic flux generated by the induction line 14, this heating heats the first thermosensitive wire 51, when the temperature reaches, for example, 90° C., the insulator 18 softens and the pair of intertwisted conductors 17 cause a spring action to cause a short-circuit, the ends of the pickup coil 22 are short-circuited, and the pair of conductors 17 of the first thermosensitive wire 51 and the pickup coil 22 form a closed circuit. Therefore, the litz line of the pickup coil 22 does not further generate heat, whereby burning and occurrence of a fire are prevented.

When contact failure or the like occurs at the fourth terminal 65 of the terminal block 61 to generate heat, the first thermosensitive wire 51 is likewise heated to short-circuit the ends of the pickup coil 22. Therefore, the fourth terminal 65 of the terminal block 61 does not further generate heat thereby to prevent burning of the circuit substrate K and occurrence of fires.

When the output adjusting transistor 44 composed of FET has high power consumption owing to its low load or the output cable of the constant-voltage control circuit 34 is disconnected to generate heat, the second thermosensitive wire 52 is heated. When the temperature reaches, for example, 90° C., the insulator 18 softens, and the pair of intertwisted conductors 17 cause a spring action to cause a short-circuit, the ends of the pickup coil 22 are short-circuited to form a closed circuit by the pair of conductors 17 of the second thermosensitive wire 52 and the pickup coil 22. Therefore, the feed to the circuit substrate K is shut down, and the output adjusting transistor 44 is cooled to prevent burning of the circuit substrate K and occurrence of fires.

When the control power supply unit 36 abnormally generates heat because of occurrence of an overload or the like, the second thermosensitive wire 52 is likewise heated, and the ends of the pickup coil 22 are short-circuited. Therefore, the feed to the control power supply unit 36 is shut down, and the control power supply unit 36 does not further generate heat, but burning of the circuit substrate K and occurrence of fires are prevented.

When contact failure or the like occurs at the first terminal 62 of the terminal block 61 to generate heat, the second thermosensitive wire 52 is likewise heated to short-circuit the ends of the pickup coil 22. Therefore, the first terminal 62 of the terminal block 61 does not further generate heat to prevent burning of the circuit substrate K and occurrence of fires.

By monitoring the color of the thermolabel 27 attached to the pickup unit P, it can be confirmed whether or not the ambient temperature exceeds a predetermined temperature.

In this manner, it is possible to effectively feed power to the vehicle V in a non-contact state. Even if the pickup coil 22 is damaged, and even if the terminal block 61, the output adjusting transistor 44 or the control power supply unit 36 generates heat, such fire accidents that the pickup coil 22 or the circuit substrate K is heated and burnt can be prevented by detecting the heating by using the thermosensitive wires 51 and 52 and short-circuiting the ends of the pickup coil 22 to form a closed circuit. Since an abnormality of the vehicle V is dealt with within the vehicle V, the induction line 14 is not affected, and other vehicles v which are normal in other respects are capable of continuing the operation, thus the operation as the system can be continued.

Since the thermosensitive wire 51 or 52 can be freely bent and also easily connected, the execution of work is facilitated, and time for a laying operation can be shortened. Also, the wire can be formed together with the pickup coil 22, so that the working efficiency can be improved. In addition, the thermosensitive wire 51 or 52 itself is low in cost, so that the system cost can be reduced.

In this respect, in the present embodiment, the output adjusting transistor 44 composed of FET, the control power supply unit 36 and the terminal block 61 have been mentioned as one example of a heating unit of the vehicle. If there is another heating unit which is likely to generate heat in the circuit substrate K, such fire accidents that the circuit substrate K is heated and burnt can be prevented by continuously laying the second thermosensitive wire 52 also in the heating unit.

Second Embodiment

Figure 9:
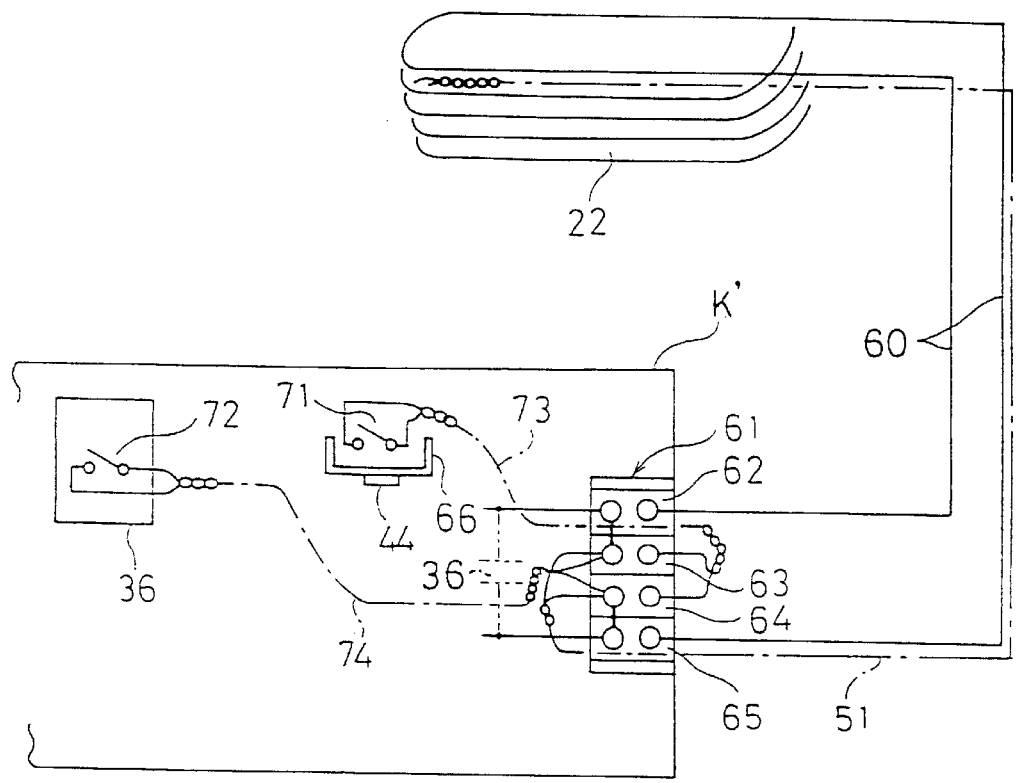
FIG. 9 is a laying view of a thermosensitive wire to be laid on a pickup coil and a circuit substrate of a non-contact feeder system according to a second embodiment of the present invention.

FIG. 9 is a laying view of a thermosensitive wire of a circuit substrate of a non-contact feeder system according to a second embodiment. In the same arrangements as those in the first embodiment shown in FIG. 8, the like numerals are attached to the like parts and the explanation thereof is omitted.

In FIG. 9, reference numerals 71 and 72 designate bimetal, which is an example of a thermosensitive element, and a bimetal 71 is set near a mounting chassis 66 of the output adjusting transistor 44 composed of FET while a bimetal 72 is set near the control power supply unit 36. The bimetal 71 is connected to the second terminal 63 and the third terminal 64 of the terminal block 61 through a third thermosensitive wire 73 laid along the first terminal 62 of the terminal block 61, while the bimetal 72 is connected to the second terminal 63 and the third terminal 64 of the terminal block 61 through a fourth thermosensitive wire 74. In this respect, the third thermosensitive wire 73 and the fourth thermosensitive wire 74 use the same thermosensitive wire as the thermosensitive wire 15.

With this structure, when the output adjusting transistor 44 composed of FET or the control power supply unit 36, which is one example of a heating unit of the vehicle, abnormally generates heat to actuate the bimetal 71 or 72, the ends of the pickup coil 22 are short-circuited, the feed to the circuit substrate K is shut down, and the third thermosensitive wire 73 or the fourth thermosensitive wire 74 is heated by a short-circuit current, and when the temperature reaches, for example, 90° C., the insulator 18 softens and the pair of intertwisted conductors 17 cause a spring action to cause a short-circuit. Therefore, a state in which the feed to the circuit substrate K' has been shut down is maintained, and the transistor 44 and the control power supply unit 36 are cooled. Thus, burning of the circuit substrate K' and occurrence of fires are prevented.

In this respect, if the structure is arranged such that only the bimetals 71 and 72 are used without using the thermosensitive wires 73 and 74 to detect abnormal heating for shutting down the feed to the circuit substrate K', when the temperature lowers due to the shut-down of the feed, the bimetals 71 and 72 turn off again to resume the feed, and the system is re-started while the cause for the abnormal heating is still unknown, which may possibly expand the abnormal state. However, since the bimetals 71 and 72 are used as a switch as described above and the thermosensitive wires 73 and 74 are used as a breaker, the thermosensitive wires 73 and 74 maintain the short-circuited state, whereby it is possible to prevent the re-starting and expansion of the abnormality.

Further, with the provision of the thermosensitive wires 73 and 74 in correspondence to the bimetals 71, 72 respectively, a heating unit of a vehicle which has generated heat abnormally, that is, the output adjusting transistor 44 or the control power supply unit 36 can be specified by detecting the thermosensitive wires 73 and 74 whose insulators 18 have softened.

In the present second embodiment, the output adjusting transistor 44 composed of FET and the control power supply unit 36 have been mentioned as one example of a heating unit of the vehicle. If there is a heating unit which is likely to generate heat inside and outside of the circuit substrate K', provision of a bimetal also to the heating unit for connecting the heating unit to the terminal block 61 through a thermosensitive wire makes it possible to likewise maintain a state in which the feed to the circuit substrate K' has been shut down, whereby burning of the circuit substrate K' and occurrence of fires are prevented.

It may be possible to lay the thermosensitive wires 73 and 74 along the heating unit of another vehicle. At this time, not only by operating the bimetal but when the temperature of the heating unit of said another vehicle exceeds a predetermined temperature, the insulator 18 softens and the conductor 17 is short-circuited, whereby the pickup coil 22 is short-circuited and the feed to the vehicle is shut down to prevent burning by heating.

Third Embodiment

Figure 10:
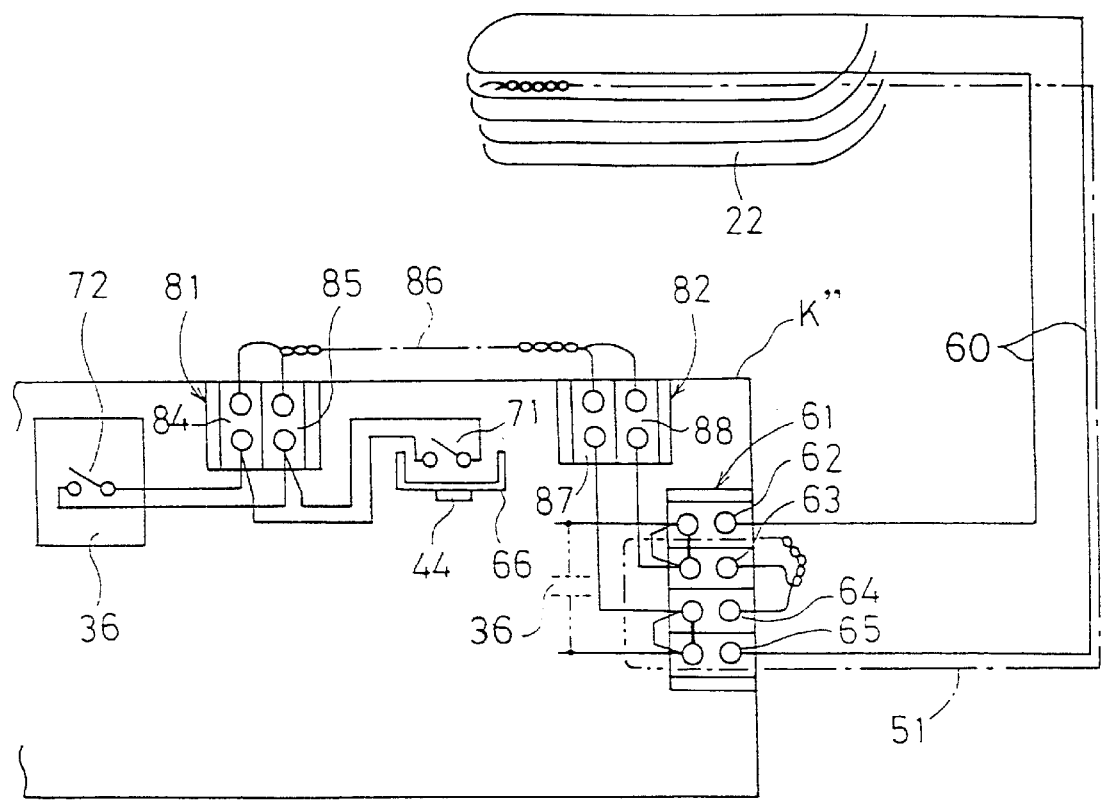
FIG. 10 is a laying view of a thermosensitive wire to be laid on a pickup coil and a circuit substrate of a non-contact feeder system according to a third embodiment of the present invention.

FIG. 10 is a laying view of a thermosensitive wire on a circuit substrate of a non-contact feeder system according to a third embodiment. In the same arrangements as those in the second embodiment shown in FIG. 9, the like numerals are attached to the like parts and the explanation thereof is omitted.

In FIG. 10, reference numeral 81 designates a second terminal block set on the circuit substrate K", and 82 a third terminal block set on the circuit substrate K". The bimetals 71 and 72 are connected in parallel, and are connected to a first terminal 84 and a second terminal 85 of the second terminal block 81, and the first terminal 84 and the second terminal 85 are connected to a first terminal 87 and a second terminal 88 of the third terminal block 82 through a fifth thermosensitive wire 86 respectively. In this respect, the fifth thermosensitive wire 86 uses the same thermosensitive wire as the thermosensitive wire 15. The first terminal 87 and the second terminal 88 of the third terminal block 82 are connected to the second terminal 63 and the third terminal 64 of the first terminal block 61 respectively.

The first thermosensitive wire 51 is laid along the first terminal 62 and the fourth terminal 65 of the first terminal block 61.

With this structure, when the output adjusting transistor 44 composed of FET or the control power supply unit 36, which is one example of a heating unit of the vehicle, abnormally generates heat to actuate the bimetal 71 or 72, the ends of the pickup coil 22 are short-circuited, the feed to the circuit substrate K" is shut down, and the fifth thermosensitive wire 86 is heated by a short-circuit current.

When the temperature reaches, for example, 90° C., the insulator 18 softens and the pair of intertwisted conductors 17 cause a spring action to cause a short-circuit, and the pair of conductors 17 of the fifth thermosensitive wire 86 and the pickup coil 22 form a closed circuit. Therefore, a state in which the feed to the circuit substrate K" has been shut down is maintained, and the transistor 44 and the control power supply unit 36 are cooled. Thus, burning of the circuit substrate K" and occurrence of fires are prevented.

If the structure is arranged such that only the bimetals 71 and 72 are used without using the fifth thermosensitive wire 86 to detect abnormal heating for shutting down the feed to the circuit substrate K', when the temperature lowers due to the shut-down of the feed, the bimetals 71 and 72 turn off again to resume the feed, and the system is re-started while the cause of the abnormal heating is still unknown, which may possibly expand the abnormal state. However, the bimetal 71 and 72 are used as a switch as described above, and the fifth thermosensitive wire 86 is used as a breaker, whereby it is possible to prevent re-starting, and expansion of the abnormality because the fifth thermosensitive wire 86 maintains the short-circuited state. Also, the fifth thermosensitive wire 86 between the terminal blocks 81 and 82 can be easily replaced, which facilitates restoring the normal operation of the system.

In the present third embodiment, the output adjusting transistor 44 composed of FET and the control power supply unit 36 have been mentioned as one example of a heating unit of the vehicle. If there is a heating unit which is likely to generate heat inside and outside of the circuit substrate K", provision of a bimetal also to the heating unit for connecting the heating unit to the terminal block 61 through a thermosensitive wire makes it possible to likewise maintain the state in which the feed to the circuit substrate K" has been shut down, whereby burning of the circuit substrate K" and occurrence of fires are prevented.

It may be possible to lay the fifth thermosensitive wire 86 along the heating unit of another vehicle. At this time, not only by operating the bimetal but when the temperature of the heating unit of said another vehicle exceeds a predetermined temperature, the insulator 18 softens and the conductor 17 is short-circuited, whereby the pickup coil 22 is short-circuited and the feed to the vehicle is shut down to prevent burning by heating.

What is claimed is:

1. A protective device for a non-contact feeder system in which an induction line for flowing a high-frequency current therethrough is laid along a moving path of a moving body, and the moving body is provided with a coil for inducing therein an electromotive force by a magnetic flux generated in said induction line so as to feed power to a load of said moving body by means of the electromotive force induced by said coil, characterized in that:

a thermosensitive wire, formed by intertwisting a pair of conductors made of non-magnetic material and covered with insulators which soften at a predetermined temperature, is laid along the induction line; and when the ambient temperature exceeds said predetermined temperature, the insulators of the thermosensitive wire soften and the conductors are short-circuited with each other, thereby causing the high-frequency current to be shut down.

2. A protective device for a non-contact feeder system according to claim 1, wherein resistors made of non-magnetic material are connected in series at predetermined intervals to the conductors of the thermosensitive wire, and a position where the ambient temperature exceeds said predetermined temperature is measured as the short-circuiting causes the resistance value of the thermosensitive wire to decrease.

3. A protective device for a non-contact feeder system in which an induction line for flowing a high-frequency current therethrough is laid along a moving path of a moving body, and the moving body is provided with a coil for inducing therein an electromotive force by a magnetic flux generated in said induction line so as to feed power to a load of said moving body by means of the electromotive force induced by said coil, characterized in that:

a heating unit of the moving body is provided with a thermosensitive element;

a thermosensitive wire, formed by intertwisting a pair of conductors made of non-magnetic material and covered with insulators which soften at each predetermined temperature, is arranged in the protective wire; and one ends of the pair of conductors of the thermosensitive wire are connected to the ends of said thermosensitive element respectively, and the other ends of the pair of conductors of the thermosensitive wire are connected to the ends of the coil respectively.

4. A protective device for a non-contact feeder system in which an induction line for flowing a high-frequency current therethrough is laid along a moving path of a moving body, and the moving body is provided with a coil for inducing therein an electromotive force by a magnetic flux generated in said induction line so as to feed power to a load of said moving body by means of the electromotive force induced by said coil, characterized in that:

a plurality of thermosensitive wires are arranged in the protective device, each thermosensitive wire being formed by intertwisting a pair of conductors made of non-magnetic material and covered with insulators which soften at a predetermined temperature;

the plurality of thermosensitive wires are laid along the coil and the heating unit of the moving body respectively;

one ends of the pair of conductors of said thermosensitive wires are connected to the ends of the coil respectively; and the insulators of the thermosensitive wire soften when the heating unit of the moving body exceeds the predetermined temperature, and the conductors are short-circuited with each other, thereby causing the pair of short-circuited conductors and the coil to form a closed circuit.

5. A protective device for a non-contact feeder system according to claim 4, wherein a thermolabel is attached to the coil.

6. A protective device for a non-contact feeder system according to claim 4, wherein a part of the thermosensitive wire is integrally formed with the coil.

* * * * *